(12) United States Patent
Guo et al.

(10) Patent No.: US 12,158,981 B2
(45) Date of Patent: Dec. 3, 2024

(54) PERSISTENT CALIBRATION OF EXTENDED REALITY SYSTEMS

(71) Applicant: GOOGLE LLC, Mountain View, CA (US)

(72) Inventors: Chao X. Guo, San Jose, CA (US); Fei Han, Santa Clara, CA (US); Sazzadur Rahman, San Jose, CA (US); Luca Ballan, San Jose, CA (US); Junyang Lu, Belmont, CA (US)

(73) Assignee: GOOGLE LLC, Mountain View, CA (US)

( * ) Notice: Subject to any disclaimer, the term of this patent is extended or adjusted under 35 U.S.C. 154(b) by 459 days.

(21) Appl. No.: 17/468,923

(22) Filed: Sep. 8, 2021

(65) Prior Publication Data

US 2022/0075447 A1     Mar. 10, 2022

Related U.S. Application Data

(60) Provisional application No. 63/075,384, filed on Sep. 8, 2020.

(51) Int. Cl.
| | |
|---|---|
| *G06F 3/01* | (2006.01) |
| *G01C 19/5776* | (2012.01) |
| *G01C 25/00* | (2006.01) |
| *G06T 7/80* | (2017.01) |
| *H04N 17/00* | (2006.01) |

(52) U.S. Cl.
CPC .......... *G06F 3/011* (2013.01); *G01C 19/5776* (2013.01); *G01C 25/00* (2013.01); *G06T 7/80* (2017.01); *H04N 17/002* (2013.01)

(58) Field of Classification Search
None
See application file for complete search history.

(56) References Cited

U.S. PATENT DOCUMENTS

| | | | |
|---|---|---|---|
| 11,662,805 B2* | 5/2023 | Halmetschlager-Funek | ................ G06F 3/038 345/156 |
| 2015/0193949 A1* | 7/2015 | Katz | ..................... G06T 19/006 345/8 |
| 2021/0027182 A1* | 1/2021 | Harris | ..................... G06N 20/20 |
| 2021/0117722 A1* | 4/2021 | Kal | ......................... H04N 23/90 |
| 2022/0206565 A1* | 6/2022 | Halmetschlager-Funek | ................ G06F 3/038 |

* cited by examiner

*Primary Examiner* — Nancy Bitar (57) ABSTRACT

Systems and techniques for persistent calibration of an electronic device configured to implement an extended reality (XR) system involve estimating and validating visual-inertial odometry (VIO) calibration parameters during an active XR session of the electronic device. Validating the estimated VIO calibration parameters involves performing a strict calibration qualification of the estimated VIO calibration parameters using a thresholding module, machine learning module, or both. An initial calibration qualification is performed concurrently with the strict calibration qualification based on VIO performance. If the estimated VIO calibration parameters pass the strict calibration qualification and initial calibration qualification, they are stored for use to calibrate the device in future XR sessions. Persistent calibration of time alignment between the inertial management unit and the image sensor of the electronic device is also performed during active XR sessions upon detection of time alignment issues.

16 Claims, 6 Drawing Sheets

PERSISTENT CALIBRATION OF EXTENDED REALITY SYSTEMS

CROSS-REFERENCE TO RELATED APPLICATIONS

The present application claims priority to U.S. Provisional Patent Application No. 63/075,384, entitled "PERSISTENT ONLINE CALIBRATION" and filed on Sep. 8, 2020, the entirety of which is incorporated by reference herein.

BACKGROUND

The performance quality of an extended reality (XR) system typically relies on the accuracy of its calibration parameters, and specifically calibration parameters related to operation of and interoperation between the image sensors and non-image sensors (accelerometers, gyroscopes, magnetometers) of the device implementing the XR system. Currently, most XR systems are calibrated using an averaging technique (sometimes referred to as the "average calibration") that involves performing a factory calibration of a large number of same-model devices and averaging the resultant calibration parameters of each device. The average parameters are then used for systems that have not been factory calibrated. The average calibration for a given XR system tends to lack precision, particularly when compared to the factory calibration of that XR system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Extended reality (XR) systems typically employ some form of motion tracking in order to maintain a record of the movement of the XR system with respect to position and orientation as it moves through an area. In some embodiments of the present XR systems, visual-inertial odometry (VIO) is employed to track motion. Herein, an "XR system" is inclusive to augmented reality (AR), virtual reality (VR), and mixed reality (MR) systems. A given XR system uses VIO to estimate, in real-time, its position and orientation (referred to as a "pose") based on image data captured by one or more image sensors and further based on inertial management unit (IMU) data (e.g., a combination of one or more of accelerometer measurements, gyroscope measurements, and magnetometer measurements), obtained via an IMU of the XR system. If an XR system is unable to accurately identify its pose, the quality of the user experience associated with the XR system may be reduced. The quality of the performance achievable by a given XR system is at least partly dependent on the accuracy of the calibration parameters of that XR system, including calibration parameters related to its VIO systems (sometimes referred to herein as "VIO calibration parameters"). Rather than calibrate each individual system at the factory, conventional XR systems rely on an average calibration for setting VIO calibration parameters, in which average values of such VIO calibration parameters across respective factory calibrations of multiple XR systems are calculated and then used as the VIO calibration parameters for a given XR system that has not been factory calibrated. However, compared to a system-specific calibration, such average calibrations typically introduce an undesirable increase in the number of motion tracking errors and tracking failures (including VIO resets and VIO initialization failures, for example). For some systems, around 30~50% more motion tracking errors and around 100% more tracking resets result from average calibration, compared to system-specific calibration. Embodiments of the XR systems provided herein use persistent calibration techniques to actively calibrate VIO calibration parameters of the XR system, such VIO calibration parameters corresponding to any of IMU intrinsics, image sensor intrinsics, IMU-image-sensor extrinsics, and IMU-image-sensor time alignment parameters. By performing this calibration during active operation of the XR system and allowing valid calibration results to persist over multiple XR sessions, the overall quality of the XR sessions is improved and the likelihood of the occurrence of VIO initialization failures and VIO resets is reduced.

To perform persistent calibration of VIO calibration parameters, an XR system estimates VIO calibration parameters while the XR system is active and, upon qualification of the estimated VIO calibration parameters, uses the estimated VIO calibration parameters in place of the original VIO calibration parameters of the XR system (e.g., VIO calibration parameters determined based on averaging, per-device factory VIO calibration parameters, or previously estimated VIO calibration parameters). In some embodiments, the XR system performs an initial qualification and a strict qualification of the estimated VIO calibration parameters to determine whether the estimated VIO calibration parameters will replace the original VIO calibration parameters, such that, if the estimated VIO calibration parameters pass the strict qualification, the estimated VIO calibration parameters persist between XR sessions.

In some embodiments, the initial qualification of a set of estimated VIO calibration parameters is performed based on observed VIO performance (e.g., characterized by a number of VIO resets or a number of VIO initialization failures) during an initial time period of a given XR session. In some embodiments, strict qualification of the estimated VIO calibration parameters is performed by comparing each of the estimated calibration parameter values and other related qualification input parameters to corresponding thresholds with a thresholding module. In some embodiments, strict qualification of the estimated VIO calibration parameters is performed by providing the estimated VIO calibration parameters and other related qualification input parameters to a machine learning (ML) module that is trained to output a qualification result indicative of an expected level of quality (e.g., accuracy) associated with a given set of estimated VIO calibration parameters. In some embodiments, the XR system employs a hybrid qualification module that relies on outputs of both a thresholding module and an ML module to determine a qualification result for a set of estimated VIO calibration parameters of the XR system.

Figure 1:
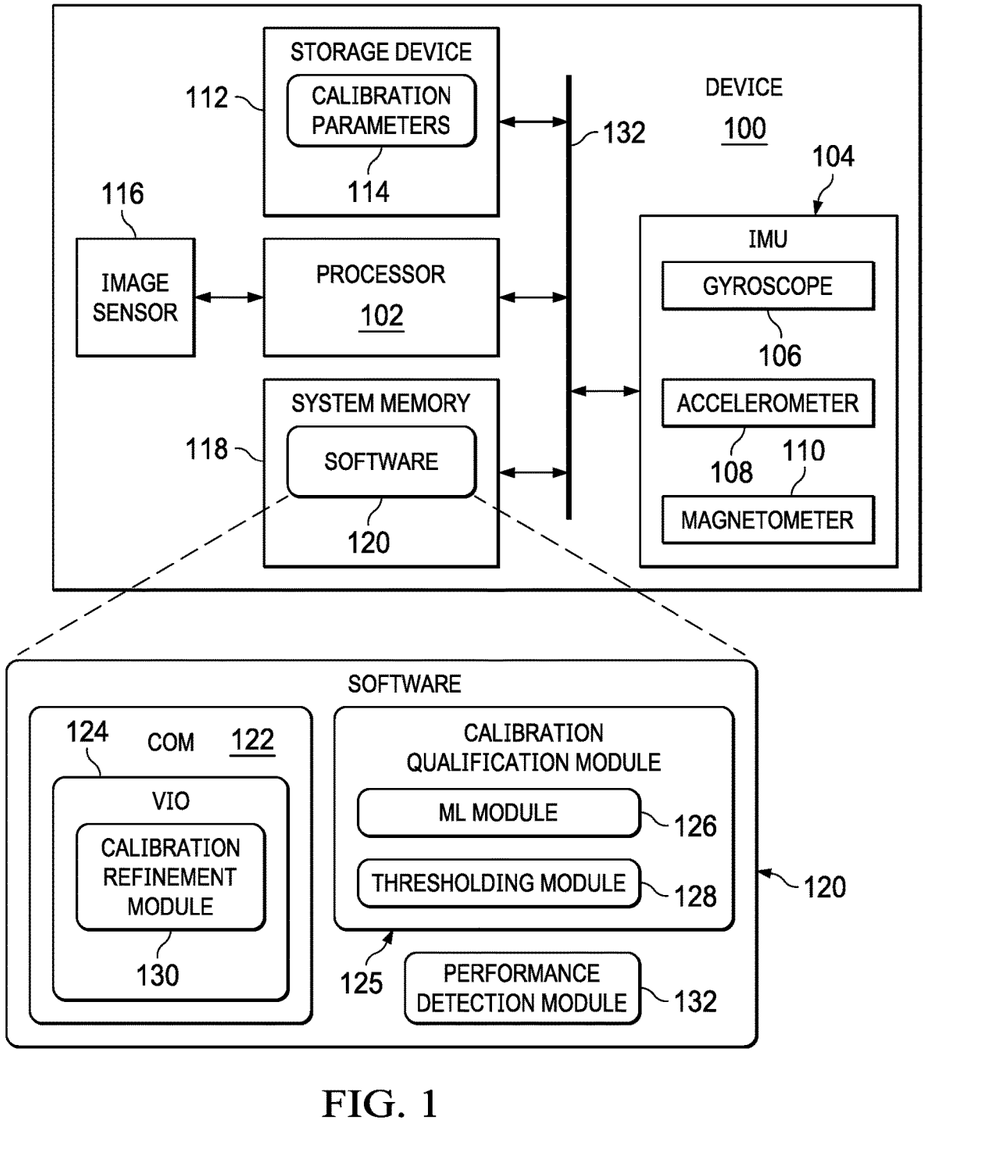
FIG. 1 is a block diagram of a device capable of implementing an extended reality (XR) system with persistent visual-inertial odometry (VIO) calibration, in accordance with some embodiments.

FIG. 1 shows a block diagram of a device 100 that is configured to implement an XR system with persistent VIO calibration. Persistent VIO calibration of the XR system involves estimation and validation of VIO calibration parameters associated with the XR system during active operation of the XR system, where a successfully validated set of VIO calibration parameters is saved for use in subsequent XR sessions. For example, the VIO calibration parameters can include, but are not limited to, IMU intrinsics, image sensor intrinsics, IMU-image-sensor extrinsics, and IMU-image-sensor time alignment parameters. According to various embodiments, the device 100 is any of a mobile electronic device (e.g., a smartphone or tablet), a wearable heads up display (WHUD), or another computing device capable of implementing an XR system.

As shown, the device 100 includes a processor 102, an IMU 104, a storage device 112, an image sensor 116, and a system memory 118. It should be understood that, in some embodiments, the device 100 includes multiple processors 102, storage devices 112, or image sensors 116. The processor 102, the IMU 104, the storage device 12, and the system memory 118 are communicatively coupled via a communications bus 132 (e.g., a serial communications bus). The image sensor 116 is coupled to the processor 102 directly in the present example. However, in some other embodiments, the image sensor 116 is instead coupled to the processor 102 via the communications bus 132.

Motion tracking is typically used in XR systems (e.g., electronic devices configured to execute XR applications; sometimes referred herein to as "XR devices") in order to maintain a record of the movement of the XR system with respect to position and orientation as it moves through an area. Tracked motion can be characterized by how many degrees of freedom are possible in movement, for example, either three degrees of freedom (3 DoF) or six degrees of freedom (6 DoF). In the present example, the IMU 104 includes a gyroscope 106, an accelerometer 108, and a magnetometer 110, which the IMU 104 uses to track motion of the device 100 with up to 6DoF. The gyroscope 106 measures angular velocities of the device 100 with respect to three respectively perpendicular axes (e.g., x-, y-, and z-axes). The accelerometer 108 measures the rate of change of the velocity of the device 100 with respect to, typically, three respectively perpendicular axes (e.g., x-, y-, and z-axes). The magnetometer 110 measures magnetic field strength along up to three respectively perpendicular axes (e.g., x-, y-, and z-axes), and the magnetic field strength measurements made by the magnetometer 110 can be used by the processor 102 in conjunction with the acceleration measurements taken by the accelerometer 108 and the angular velocity measurements taken by the gyroscope 106 to more accurately track motion of the device 100 in 6 DoF (e.g., motion in x-direction, motion in y-direction, motion in z-direction, roll, pitch, and yaw).

The storage device 112 is a mass storage device, such as a hard disk drive, solid state drive, memory card, or the like.

The storage device 112 stores calibration parameters 114, which include VIO calibration parameters related to IMU intrinsics, image sensor intrinsics, IMU-image-sensor extrinsics, and IMU-image-sensor time alignment parameters.

For example, the calibration parameters 114 can include intrinsic calibration parameters of the IMU 104 (sometimes referred to herein as "IMU intrinsics"). Examples of calibration parameters that are considered IMU intrinsics include gyroscope scale, gyroscope skewness, accelerometer scale, accelerometer skewness, accelerometer misalignment, gyroscope misalignment, rotation quaternion between the gyroscope and the accelerometer (i.e., "gyroscope-accelerometer rotation quaternion"), gyroscope bias, and accelerometer bias.

For example, the calibration parameters 114 can include intrinsic calibration parameters of the image sensor 116 (sometimes referred to herein as "image sensor intrinsics"). Examples of calibration parameters that are considered image sensor intrinsics include focal length and the optical center of the image sensor 116.

For example, the calibration parameters 114 can include extrinsic calibration parameters corresponding to the IMU 104 and the image sensor 116 (sometimes referred to herein as "IMU-image-sensor extrinsics"). Typically, an unknown transformation exists between the reference frame of the IMU 104 (the "IMU reference frame") and the reference frame of the image sensor (the "optical reference frame"), and this transformation can be expressed by a rotation quaternion corresponding to the rotation from the optical reference frame to the IMU reference frame and a translation vector corresponding and translation vector corresponding to a translation from the IMU-derived 3D position of device 100 to the optical reference frame. This rotation quaternion and translation vector are examples of calibration parameters that are considered IMU-image-sensor extrinsics.

For example, the calibration parameters 114 can include calibration parameters for performing time alignment between the IMU 104 and the image sensor 116 (sometimes referred to herein as "IMU-image-sensor time alignment parameters"). An example of a calibration parameter that is considered to be an IMU-image-sensor time alignment parameters includes the time offset between the IMU 104 and the image sensor 116 (e.g., between timestamps generated respectively thereby).

The system memory 118 is configured to store instructions and other relevant data for the execution of software 120. The software 120 includes non-transitory computer-readable instructions that are executable by the processor 102 during an XR session, for example. In some embodiments, the software 120 includes a Concurrent Odometry and Mapping (COM) module 122, which includes a VIO module 124, a calibration qualification module 125, and a performance detection module 132, some or all of which are utilized in connection with the persistent calibration techniques described herein.

In some embodiments, the COM module 122 facilitates drift-free and highly accurate motion tracking by using image sensor data generated by the image sensor 116 and IMU sensor data (e.g., gyroscope data, accelerometer data, and magnetometer data) generated by the IMU 104 to track motion of the device 100 and concurrently building a three-dimensional representation of the local environment around the device 100. For example, the COM module 122 periodically updates the three-dimensional representation of the local environment with feature descriptors generated based on such image sensor data and IMU sensor data and uses the updated three-dimensional representation of the local environment to correct drift and other posed errors in the tracked motion.

The COM module 122 includes the VIO module 124, which performs motion tracking (e.g., both position and location tracking) for the COM module 122 based on image sensor data output by the image sensor 116 and IMU sensor data output by the IMU 104. During a given XR session, the VIO module 124 concurrently tracks the motion of the device 100 and periodically estimates VIO calibration parameters for the device 100. The calibration qualification module 125 attempts to validate each set of estimated VIO calibration parameters using either or both of a machine learning (ML) module 126 and a thresholding module 128, as explained further below, as part of a strict calibration qualification.

As new sets of VIO calibration parameters are estimated, they are used as the current VIO calibration parameters in place of the previously estimated set of VIO calibration parameters or, initially, in place of the device 100's original VIO calibration parameters (e.g., following a reset of the VIO module 124, sometimes referred to as a "VIO reset"). The processor 102 uses the qualification calibration module 125 to perform a strict validation (sometimes referred to herein as a "strict calibration qualification") of the estimated VIO calibration parameters, and, in some embodiments, the results of this strict calibration qualification are compared to corresponding results of a strict calibration qualification of the original VIO calibration parameters of the device 100. For example, a first quality score generated by the qualification calibration module 125 for the estimated VIO calibration parameters is compared to a second quality score generated by the qualification module 125 for the original VIO calibration parameters, and the estimated VIO calibration parameters pass the strict calibration qualification if the first quality score is greater than the second quality score.

In some embodiments, if the estimated VIO calibration parameters pass the strict calibration qualification, the original VIO calibration parameters are replaced by the estimated VIO calibration parameters. In some embodiments, the estimated VIO calibration parameters are stored in the storage device 112, while the original VIO calibration parameters are not discarded, but are instead saved (e.g., in the event that the device 100 needs to revert to the original VIO calibration parameters based on, for example, undesirable VIO performance during an initial time period). That is, the estimated VIO calibration parameters are stored as part of the calibration parameters 114 in the storage device 112 for use in future XR sessions. Otherwise, if the estimated VIO calibration parameters fail the strict calibration qualification, the original VIO calibration parameters are retained and the estimated VIO calibration parameters are not saved. In this way, VIO calibration parameters that are estimated during an active XR session of the device 100, if sufficiently accurate, can persist through multiple XR sessions.

In some embodiments, in addition to the calibration qualification operations performed by the calibration qualification module 125, the performance detection module 132 is implemented, which determines that a given set of estimated VIO calibration parameters is "bad" (e.g., not expected to be suitable for use) based on VIO initialization failures or VIO resets that occur after such VIO calibration parameters are used as the current VIO calibration parameters for the device 100. In some embodiments, the performance detection module 132 indicates that a given set of VIO calibration parameters is "bad" responsive to detecting more than about 20 to 30 VIO initialization failures or detecting more than about 5 to 15 VIO resets occurring within the first 30 seconds after the set of VIO calibration parameters is implemented as the current VIO calibration parameters for the device 100. In some embodiments, the VIO performance detection performed by the performance detection module 132 is performed during an initial time period (e.g., approximately the first 30 seconds) of a given XR session concurrently with performance of the strict calibration qualification performed by the calibration qualification module 125. In some embodiments, if the performance detection module 132 detects unacceptable VIO performance, then the processor 102 causes original VIO calibration parameters to be used for the current calibration, and the estimated VIO calibration parameters are discarded without being saved, even if they otherwise pass the strict calibration qualification. In some embodiments, the VIO performance detection performed by the performance detection module 132 is considered an "initial calibration qualification".

In some embodiments, the performance detection module 132 is also used to detect VIO fault conditions that are indicative of specific calibration issues, such as time alignment issues between the camera 116 and the IMU 104. For example, the performance detection module 132 determines that a VIO fault condition has occurred responsive to determining that about 10 or more initialization failures or about 2 or more VIO resets have occurred during the first 10 seconds of a new session or the first 10 seconds after time alignment parameters (e.g., time offset) are updated. In some embodiments, the performance detection module 132 attempts to exclude VIO resets caused by fast motion or lack of features from this determination by excluding VIO resets that occur when a total number of observed features (i.e., not just inlier features) in images captured by the image sensor 116 are less than about 200. In response to the performance detection module 132 determining that VIO fault condition has occurred, the processor 102 executes a time alignment process, as described further below.

Figure 2:
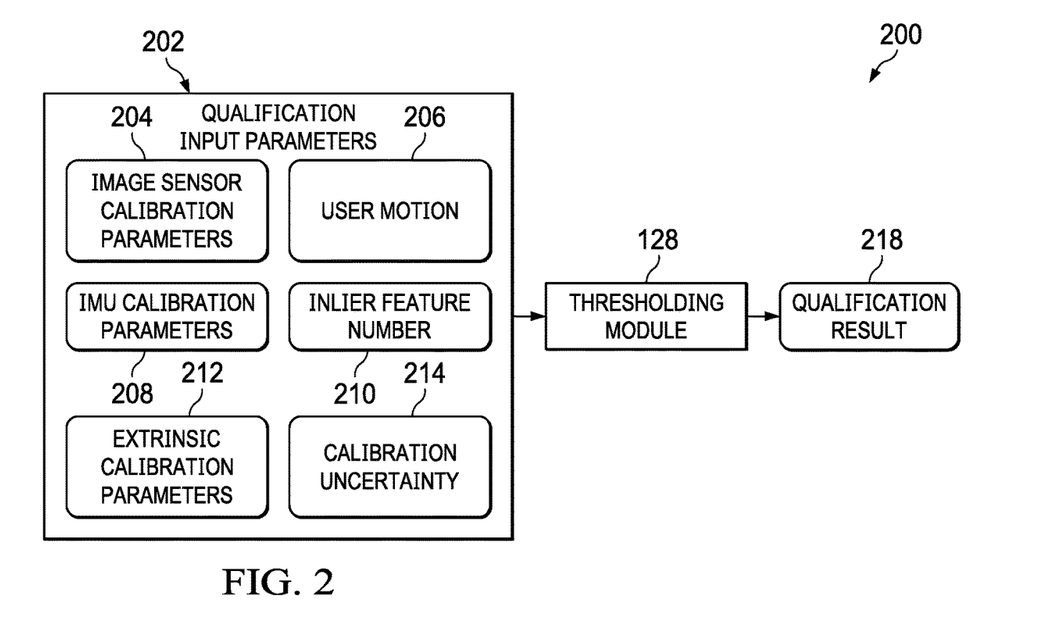
FIG. 2 is a block diagram of a thresholding-based calibration qualification system, in accordance with some embodiments.

FIG. 2 shows a diagram of a calibration qualification module 200 (e.g., an embodiment of the calibration qualification module 125 of FIG. 1) that performs a threshold-based qualification of a set of VIO calibration parameters using an embodiment of the thresholding module 128. The present example is provided in the context of an embodiment of the device 100 of FIG. 1 and like reference numerals are used to refer to like elements.

In some cases, it is desirable to determine whether estimated VIO calibration parameters associated with an XR system improve performance of the XR system (i.e., whether the estimated VIO calibration parameters are valid). For example, it is possible that the estimated VIO calibration parameters described herein diverge away from their ground truth in some cases (e.g., due to bad user motion or a relatively featureless environment shown in images captured by the image sensor 116), resulting in potentially worse calibration quality when using such divergent ("bad") VIO calibration parameters compared to that of the original VIO calibration parameters. The processor 102 performs validation of estimated VIO calibration parameters using the calibration qualification module 200 to identify any VIO calibration parameters that have diverged away from their ground truth. This reduces the likelihood that bad VIO calibration parameters are used as the current VIO calibration parameters for the device 100 during a given XR session and reduces the likelihood that such bad VIO calibration parameters are saved for use as original VIO calibration parameters in subsequent XR sessions.

As shown, the thresholding module 128 receives a number of qualification input parameters 202 as inputs. The qualification input parameters 202 include, for example, any of image sensor calibration parameters 204, user motion data 206, IMU calibration parameters 208, inlier feature number 210, extrinsic calibration parameters 212, and calibration uncertainty 214.

The image sensor calibration parameters 204 include, for example, any of the image sensor intrinsics described above. The IMU calibration parameters 208 include, for example, any of the IMU intrinsics described above. The extrinsic calibration parameters 212 include any of the IMU-image-sensor extrinsics and IMU-image-sensor time alignment parameters described above. In some embodiments, the image sensor calibration parameters 204, the IMU calibration parameters 208, and the extrinsic calibration parameters 212 include statistical information (e.g., the difference between maximum and minimum values calculated for each parameter over a given time period, error variances for each parameter, and the like) related to the above-referenced calibration parameters, in addition to or instead of the raw calibration parameter values themselves.

In addition to the VIO calibration parameters themselves, several secondary statistics are provided as inputs to the calibration qualification module 200, with these secondary statistics being indicative of the quality of the set of estimated VIO calibration parameters. For example, the quality of a given set of estimated VIO calibration parameters typically depends, at least in part, on the amount of information that has accumulated from relevant sensor measurements (e.g., measurements made by the IMU 104 and the image sensor 116). That is, less information being available for estimating the set of VIO calibration parameters, corresponds to a lower quality calibration. Motion box bounding volume (indicative of user motion, for example) and the number of features used in a given VIO filter update are two examples of statistics that are indicative of the amount of accumulated sensor measurement data. A VIO filter update is a process that updates internal states of the VIO module 124 (that is, the process updates location and orientation states estimated by the VIO module 124 based on new sensor measurements, including features detected in corresponding captured images). Such internal states can include, for example, the location or pose of the device 100, the calibration parameters used by the VIO module 124, and the like. The user motion data 206 includes the motion box bounding volume. The inlier feature number 210 corresponds to the number of visual features used in a given VIO filter update, excluding outlier features. For example, the inlier features of a given image are a subset of the total features identified in that image.

Calibration uncertainty 214 is calculated by the VIO filter of the VIO module 124. For example, the VIO filter estimates the calibration uncertainty of each state it estimates. Higher calibration uncertainty is typically associated with lower calibration accuracy.

The thresholding module 128 compares each of the qualification input parameters to respective threshold values, then outputs a qualification result 218. In some embodiments, the qualification result 218 is a Boolean value indicative of whether a set of estimated VIO calibration parameters has passed or failed validation. For example, if all of the qualification input parameters 202 are determined by the thresholding module 128 to be within their corresponding threshold ranges (e.g., higher than a corresponding threshold value or lower than a corresponding threshold value, depending on the particular qualification input parameter 202 being considered), the qualification result 218 is a high Boolean value indicative of successful validation. If any of the predetermined number of qualification input parameters 202 are determined by the thresholding module 128 to be outside of their corresponding threshold ranges, the qualification result 218 is a low Boolean value indicative of unsuccessful validation.

In some embodiments, the threshold values or ranges used by the thresholding module 128 are determined via testing using datasets with ground truth calibrations. In some embodiments, the threshold values or ranges used by the thresholding module 128 are set to relatively lower values for an initial calibration qualification of a given set of estimated VIO calibration parameters, then are set to relatively higher values for a subsequent strict calibration qualification of the set of estimated VIO calibration parameters (e.g., to determine, at the end of an XR session, whether the set of estimated VIO calibration parameters should be saved for use in subsequent XR sessions or discarded).

Figure 3:
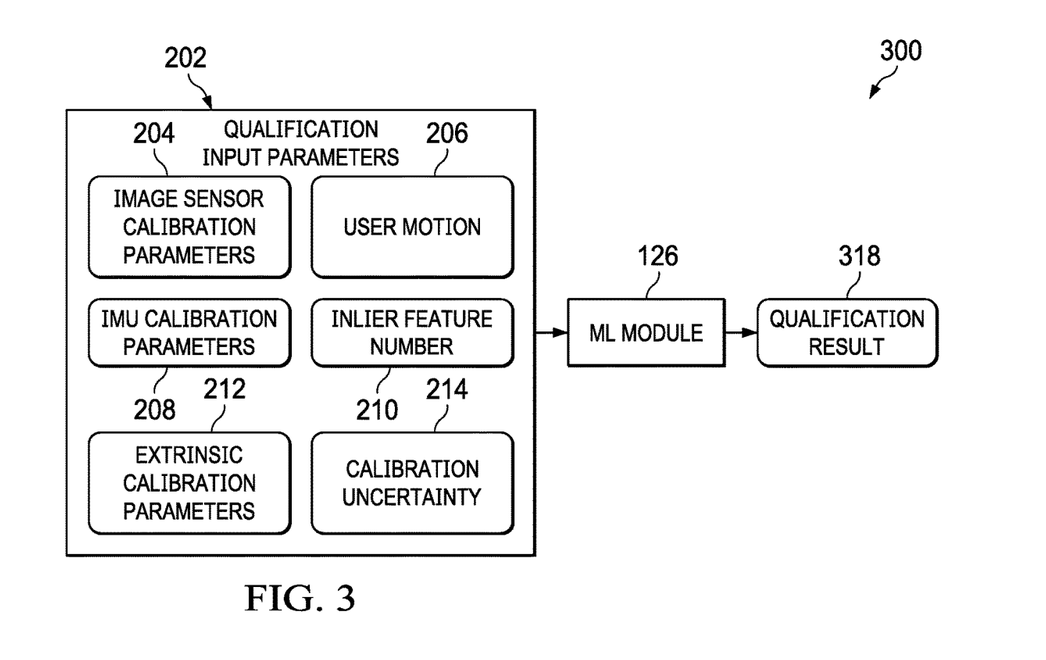
FIG. 3 is a block diagram of a machine-learning-based calibration qualification system, in accordance with some embodiments.

FIG. 3 shows a diagram of a calibration qualification module 300 (e.g., an embodiment of the calibration qualification module 125 of FIG. 1) that performs a machine-learning-based qualification of a set of VIO calibration parameters using an embodiment of the ML module 126. The present example is provided in the context of an embodiment of the device 100 of FIG. 1 and like reference numerals are used to refer to like elements.

The ML module 126 implements a trained ML model that receives the qualification input parameters 202 (described above) and outputs a qualification result 318 indicative of whether a given set of estimated VIO calibration parameters is of high quality or low quality and, accordingly, whether the set of estimated VIO calibration parameters passes or fails validation.

In some embodiments, the qualification result 318 is a Boolean value indicative of whether a set of estimated VIO calibration parameters has passed or failed validation. In some embodiments, the qualification result 318 is a quality score indicative of the expected likelihood that the set of estimated VIO calibration parameters converge to ground truth (e.g., with a quality score 318 closer to 1 being higher quality and a quality score 318 closer to 0 being lower quality).

Figure 4:
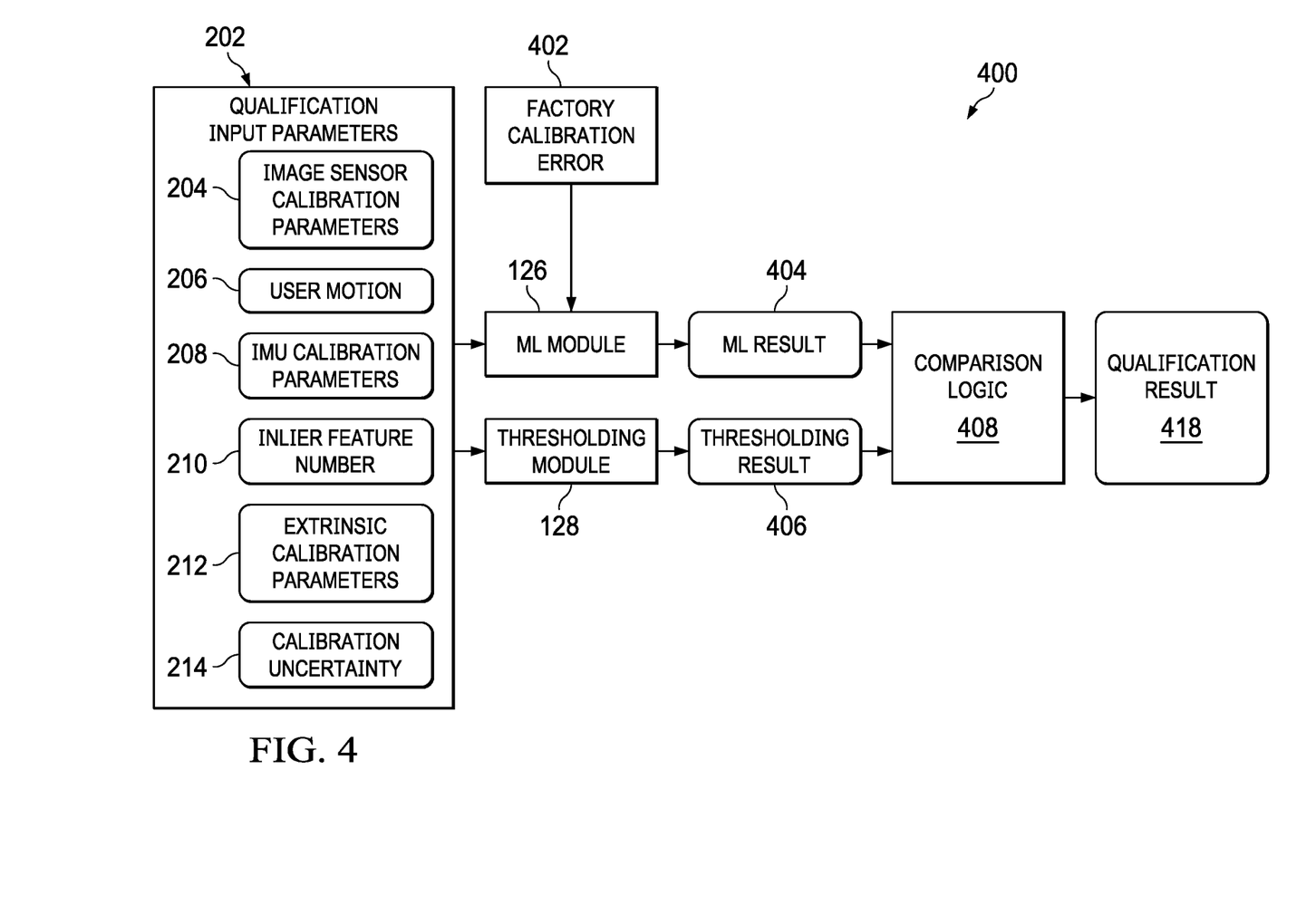
FIG. 4 is a block diagram of a hybrid calibration qualification system, in accordance with some embodiments.

FIG. 4 illustrates shows a diagram of a calibration qualification module 400 (e.g., an embodiment of the calibration qualification module 125 of FIG. 1) that performs a hybrid qualification of a set of VIO calibration parameters using embodiments of both the ML module 126 and the thresholding module 128. The present example is provided in the context of an embodiment of the device 100 of FIG. 1 and like reference numerals are used to refer to like elements.

In the present example, some or all of the qualification input parameters 202 are provided to the ML module 126 and the thresholding module 128. The ML 126 module implements a trained ML model that receives the qualification input parameters 202 (described above) and outputs an ML qualification result 404 indicative of whether a given set of estimated VIO calibration parameters is of high quality or low quality. The thresholding module 128 compares received qualification input parameters 202 to respective threshold values or ranges, and outputs a thresholding qualification result 406 based on, for example, whether any of the qualification input parameters 202 are outside of their respective threshold ranges. In some embodiments, the ML qualification result 404 is a quality score, as described above. In other embodiments, the ML qualification result 404 is a Boolean value indicative of whether the set of estimated VIO calibration parameters being assessed passes or fails validation.

Comparison logic 408 receives and compares the ML qualification result 404 and the thresholding qualification result 406. If both the ML qualification result 404 and the thresholding result 406 individually indicate that the set of estimated VIO calibration parameters passes validation, the comparison logic 408 outputs a qualification result 418 that indicates that the set of estimated VIO calibration parameters passes validation. Otherwise, if one or both of the ML qualification result 404 and the thresholding result 406 indicate that the set of estimated VIO calibration parameters does not pass validation, the comparison logic 408 outputs a qualification result 418 that indicates that the set of estimated VIO calibration parameters fails validation. In some embodiments, the qualification result 418 is a Boolean value indicative of whether the set of estimated VIO calibration parameters being assessed passes or fails validation. In other embodiments, the qualification result 418 is a non-binary quality score indicative of whether the set of estimated VIO calibration parameters being assessed passes or fails validation.

In some embodiments, in addition to receiving the qualification parameters 202, the ML module 126 also receives factory calibration error data 402 that includes a measure of error between the set of estimated VIO calibration parameters and per-device VIO calibration parameters (e.g., with the per-device VIO calibration parameters acting as ground truth when determining the error).

In some embodiments, the thresholding module 128 only receives a subset of the qualification input parameters 202. For example, the thresholding module 128 may only receive VIO calibration parameters that are considered difficult to converge to ground truth, such as accelerometer scale, accelerometer misalignment, and focal length, and calibration uncertainties associated with these VIO calibration parameters, in addition to the user motion 206 inlier feature number 210, and calibration uncertainty 214.

Figure 5:
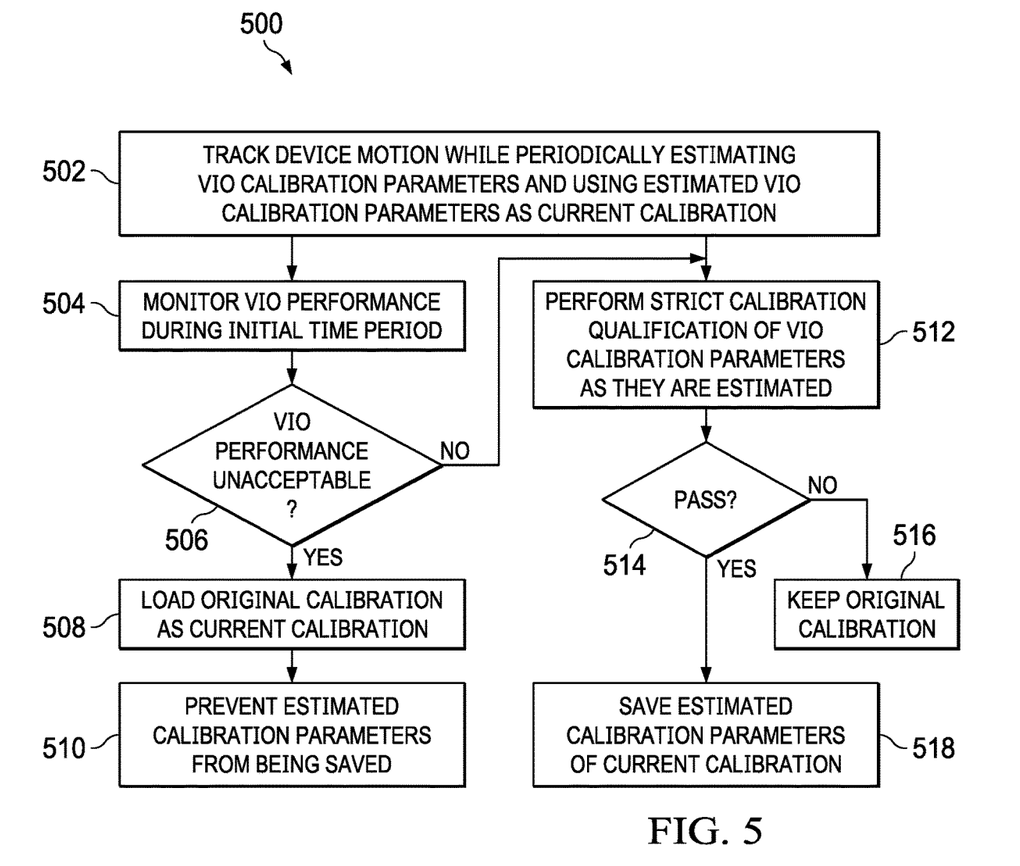
FIG. 5 is a flow diagram of a method of persistent calibration of an XR system, in accordance with some embodiments.

FIG. 5 illustrates a flow diagram of a method 500 of performing persistent calibration of an XR system, according to some embodiments. The method 500 is implemented in some embodiments of the device 100 shown in FIG. 1. For example, the method 500 is performed during an XR session that is being implemented using the device 100. Like reference numerals from the example of the device 100 are used to refer to like components in the present example. In some embodiments, the method 500 is implemented by executing non-transitory, computer-readable instructions using the processor 102 of the device 100. The method 500 is performed during each XR session implemented via the device 100, for example.

At block 502, the processor 102 tracks device motion using the VIO module 124 while periodically estimating calibration parameter values (e.g., IMU intrinsics, image sensor intrinsics, IMU-image-sensor extrinsics, IMU-image-sensor time alignment parameters) and using these estimated calibration parameter values as the current calibration for the VIO module 124.

At block 504, the processor 102 uses the performance detection module 132 to detect unacceptable performance of the estimated VIO calibration parameters during an initial time period (e.g., during, approximately, the first 30 seconds of the XR session). This acts as an initial validation (or "initial calibration qualification") of the estimated VIO calibration parameters, since unacceptable performance (such as relatively frequent VIO resets and VIO initialization failures) of the VIO module 124 is generally attributable to issues with the accuracy of the VIO calibration parameters. In some embodiments, the performance detection module 132 detects unacceptable performance of the VIO calibration parameters based whether more than a first threshold number of VIO resets have occurred during the initial time period or whether more than a second threshold number of VIO initialization failures have occurred during the initial time period. In some embodiments, the first threshold is about 5 to 15 VIO resets and the second threshold is about 20 to 30 VIO initialization failures.

At block 506, the processor 102 determines whether unacceptable VIO performance has been detected, based on the output of the performance detection module 132. If unacceptable VIO performance is detected, the method proceeds to block 508. Otherwise, if unacceptable VIO performance is not detected, the method proceeds to block 512. It should be understood that blocks 504 through 510 are performed concurrently with the performance of at least block 512 during, at most, the initial time period.

At block 508, in response to the detection of unacceptable VIO performance, the processor 102 loads an original calibration as the current calibration. In some embodiments, the original calibration includes VIO calibration parameters from a previous XR session. In some embodiments, the original calibration includes per-device factory VIO calibration parameters. In some embodiments, the original calibration includes VIO calibration parameters derived via the averaging calibration technique described above.

At block 512, the processor 102 performs a strict calibration qualification of the estimated VIO calibration parameters. As described above, to perform the strict calibration qualification, the calibration qualification module 125 uses the ML module 126, the thresholding module 128, or both to generate a qualification result, based on which the processor 102 determines whether the estimated VIO calibration parameters pass validation. In some embodiments, the calibration qualification module 125 outputs a qualification result, such as a Boolean value or quality score, that is indicative of whether the estimated VIO calibration parameters pass the strict calibration qualification. In some embodiments, the estimated VIO calibration parameters pass the strict calibration qualification if the qualification result is a Boolean value of "1". In some embodiments, the estimated calibration parameters pass the strict calibration qualification if the qualification result is a quality score that is higher than a predetermined threshold.

In some embodiments, a quality score of the qualification result output by the calibration qualification module 125 for the estimated VIO calibration parameters is compared to a quality score of the original calibration. If the quality score of the estimated VIO calibration parameters is higher than that of the original calibration, then the estimated VIO calibration parameters pass the strict calibration qualification. Otherwise, the estimated VIO calibration parameters fail the strict calibration qualification.

At block 514, if the results of the strict calibration qualification indicate that the estimated VIO calibration parameters pass, then the current calibration (including the estimated VIO calibration parameters) is saved at block 518 for use in future XR sessions. In some embodiments, only the set of estimated calibration parameters that most recently passed the strict calibration qualification at the end of a given XR session is saved at block 518. Otherwise, the current calibration is discarded, and the original calibration is retained at block 516. In some embodiments, if the method 500 has, during the XR session, proceeded to block 510 and estimated VIO calibration parameters are prevented from being saved, then the estimated VIO calibration parameters are discarded regardless of whether they passed the strict calibration qualification.

An example of a type of calibration for an XR system is time alignment calibration. It is typically desirable for the timing between the image sensor 116 of the device 100 and the IMU 104 to be aligned, such that images captured by the image sensor 116 are substantially temporally synchronized (or "temporally aligned") with IMU events (e.g., IMU sensor measurements) occurring at the IMU 104. If sufficiently large temporal misalignment between the IMU 104 and the image sensor 116 occurs, the VIO module 124 is forced to reset or initialization of the VIO module 124 fails, either of which has an undesirable impact on performance of the XR system. Temporal alignment of the image sensor 116 and the IMU 104 can be improved via persistent calibration of related VIO calibration parameters, such as a time offset that is added to timestamps of images captured by the image sensor 116 to better align the timing of the image sensor 116 with that of the IMU 104.

Figure 6:
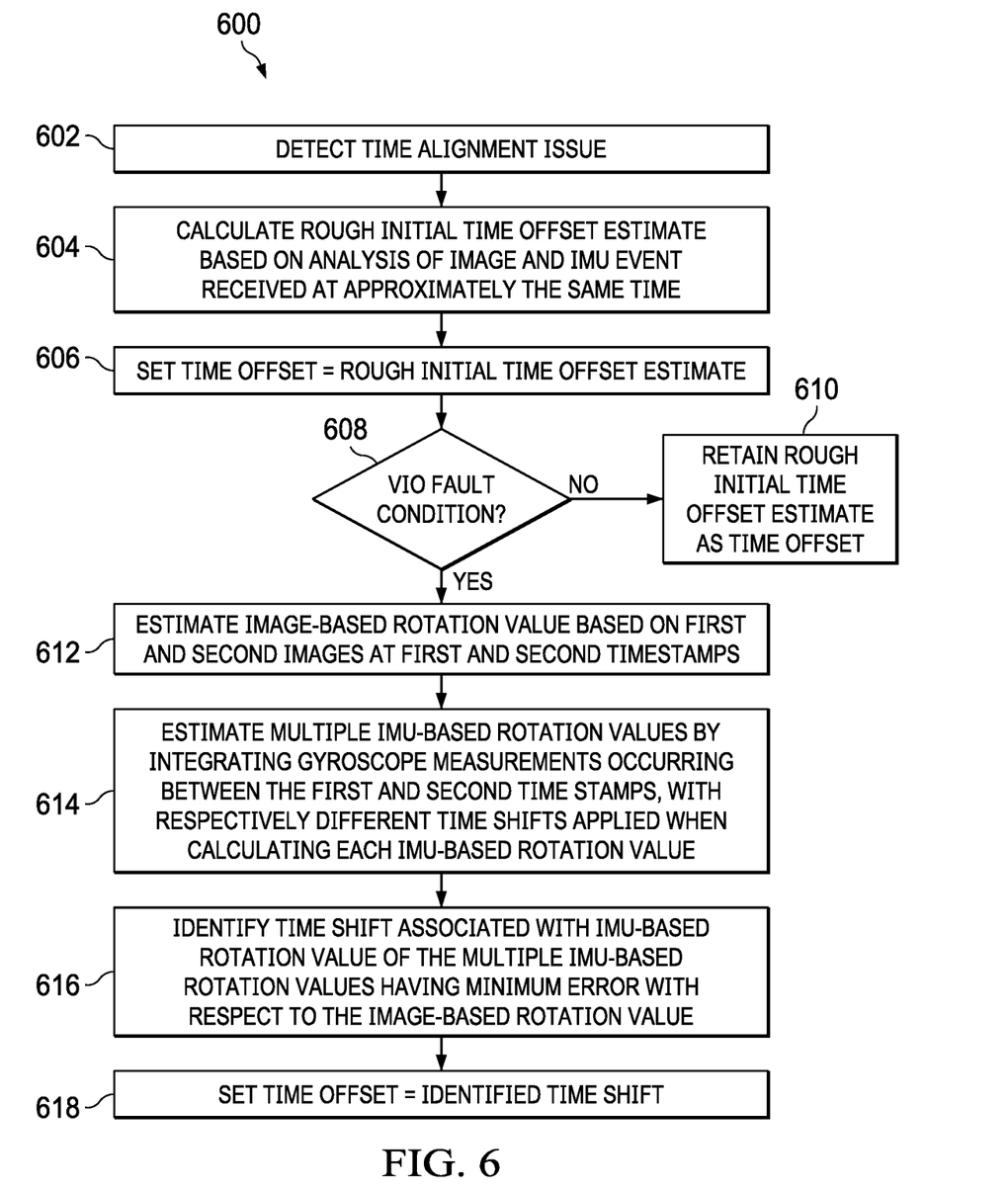
FIG. 6 is a flow diagram of a method of calibrating a time offset between an IMU and an image sensor of an XR system, in accordance with some embodiments.

FIG. 6 illustrates a flow diagram of a method 600 of calibrating the time alignment between an IMU and an image sensor of an XR system, according to some embodiments. The method 600 is implemented in some embodiments of the device 100 shown in FIG. 1. Like reference numerals from the example of the device 100 are used to refer to like components in the present example. In some embodiments, the method 600 is implemented by executing non-transitory, computer-readable instructions using the processor 102 of the device 100.

At block 602, a time alignment issue is detected. In some embodiments, time alignment issues are detected based on an image event (e.g., capturing an image at the image sensor 116) and an IMU event (e.g., generating accelerometer, gyroscope, or magnetometer data at the IMU 104) that are received by the processor at approximately the same time having larger than expected gaps in their respective timestamps (e.g., after taking the current time offset value into consideration). In some embodiments, a time alignment issue is identified responsive to more than two VIO initialization failures or more than five VIO resets occurring within the first 30 seconds of a given XR session. Herein, VIO initialization failures occur to instances in which the VIO 124 fails to start, whereas VIO resets refer to instances in which the VIO 124 fails to continue running after having successfully started. In some embodiments, time alignment issues are detected via the performance detection module 132.

At block 604, the processor calculates a rough initial time offset estimate based on analysis an image and IMU sensor data (e.g., gyroscope data, accelerometer data, magnetometer data) that are received by the processor 102 at approximately the same time (e.g., within about 1 ms of one another). In some embodiments, the time at which the image and IMU sensor data are received by the processor 102 is associated with two separate callback events at the processor 102, an image callback event having an image callback timestamp and an IMU callback having an IMU callback timestamp, and each of these callback timestamps corresponding to approximately the same time. In some embodiments, the rough initial time offset estimate is determined by calculating a first sum of an IMU timestamp associated with the IMU sensor data and an expected IMU processing time, calculating a second sum of an image sensor timestamp associated with initiation of capture of the image by the image sensor 116, expected exposure time, expected rolling shutter readout time, and expected image processing time, then calculating a difference between the first sum and the second sum. The calculated difference is the rough initial time offset estimate. An example of rough initial time offset estimation is provided below in the example of FIG. 7.

At block 606, the processor sets the time offset equal to the rough initial time offset estimate. In the present example, the time offset is added to the image timestamp in order to align the timing of images captured by the image sensor 116 with the timing of IMU events (e.g., IMU sensor measurements and processing) of the IMU 104.

At block 608, the processor determines whether a VIO fault condition has occurred. For example, a VIO fault condition occurs when at least 10 VIO initialization failures or at least two VIO resets occur during the first 10 seconds of an XR session or the first 10 seconds after, for example, initiation of the XR session. In some embodiments, such VIO fault conditions are detected via the performance detection module 132.

At block 610, in response to determining that no VIO fault condition has occurred, the processor retains the rough initial time offset estimate as the time offset. In some embodiments, the rough initial time offset is retained for future use at the end of the XR session. In some embodiments, the rough initial time offset is only retained upon passing a strict calibration qualification (e.g., implemented by the calibration qualification module 125).

At block 612, in response to determining that a VIO fault condition has occurred after using the rough initial time offset estimate as the time offset, the processor estimates an image-based rotation value based on first and second images having, respectively, a first timestamp and a second timestamp corresponding to respectively different times (with a difference of about 3 seconds, for example). In some embodiments, the image-based rotation value is calculated using a RANSAC (RANdom Sample Consensus) technique, such as a 2-point RANSAC technique or a 5-point RANSAC technique. For example, in the 2-point RANSAC technique, two pairs of matched points are identified in two adjacent images (an 'image pair'), and these pairs of matched points are used as a basis for calculating the image-based rotation value. The 2-point RANSAC assumes that there is only rotation between two camera poses. For example, in the 5-point RANSAC technique, five pairs of matched points are identified in two adjacent images, and these pairs of matched points are used as a basis for calculating the image-based rotation value. The 5-point RANSAC assumes that there is both rotation and translation between two camera poses. In some embodiments, image pairs with less than about 25 matched points are considered unreliable and are dropped, rather than being used for image-based rotation value calculation. In some embodiments, a 2-point or 5-point RANSAC technique is executed to calculate an initial image-based rotation value and a set of inlier points, then a 2-point or 5-point least squares regression analysis is performed based on these results, further refining the initial image-based rotation value to determine a refined image-based rotation value.

At block 614, the processor estimates multiple IMU-based rotation values. For each IMU-based rotation value calculated by the processor, the processor integrates gyroscope measurements that occurred between a first time and a second time, where the first time is the sum of the first timestamp and a time shift, and the second time is the sum of the second timestamp and the time shift. The time shift is different for each respective IMU-based rotation value calculation. In some embodiments, the processor calculates a respective IMU-based rotation value for each time shift of an array of candidate time shifts. In some embodiments, such an array of candidate time shifts is centered at a time shift having a value equal to the rough initial time offset estimate. In some embodiments, the array of candidate time shifts is defined as a search window having a defined size and granularity that is centered around the rough initial time offset estimate.

At block 616, the processor identifies a time shift associated with an IMU-based rotation value of the multiple IMU-based rotation values having minimum error with respect to the image-based rotation value and compared to the corresponding errors of the other IMU-based rotation values. That is, the identified time shift is the time shift of the array of candidate time shifts that provides the minimum error between its corresponding IMU-based rotation value and the image-based rotation value.

At block 618, the processor sets the time offset equal to the identified time shift. The XR system then utilizes the time offset for time alignment between the IMU 104 and the image sensor 116 (e.g., the time offset is added to the image sensor timestamps associated with images captured by the image sensor).

Figure 7:
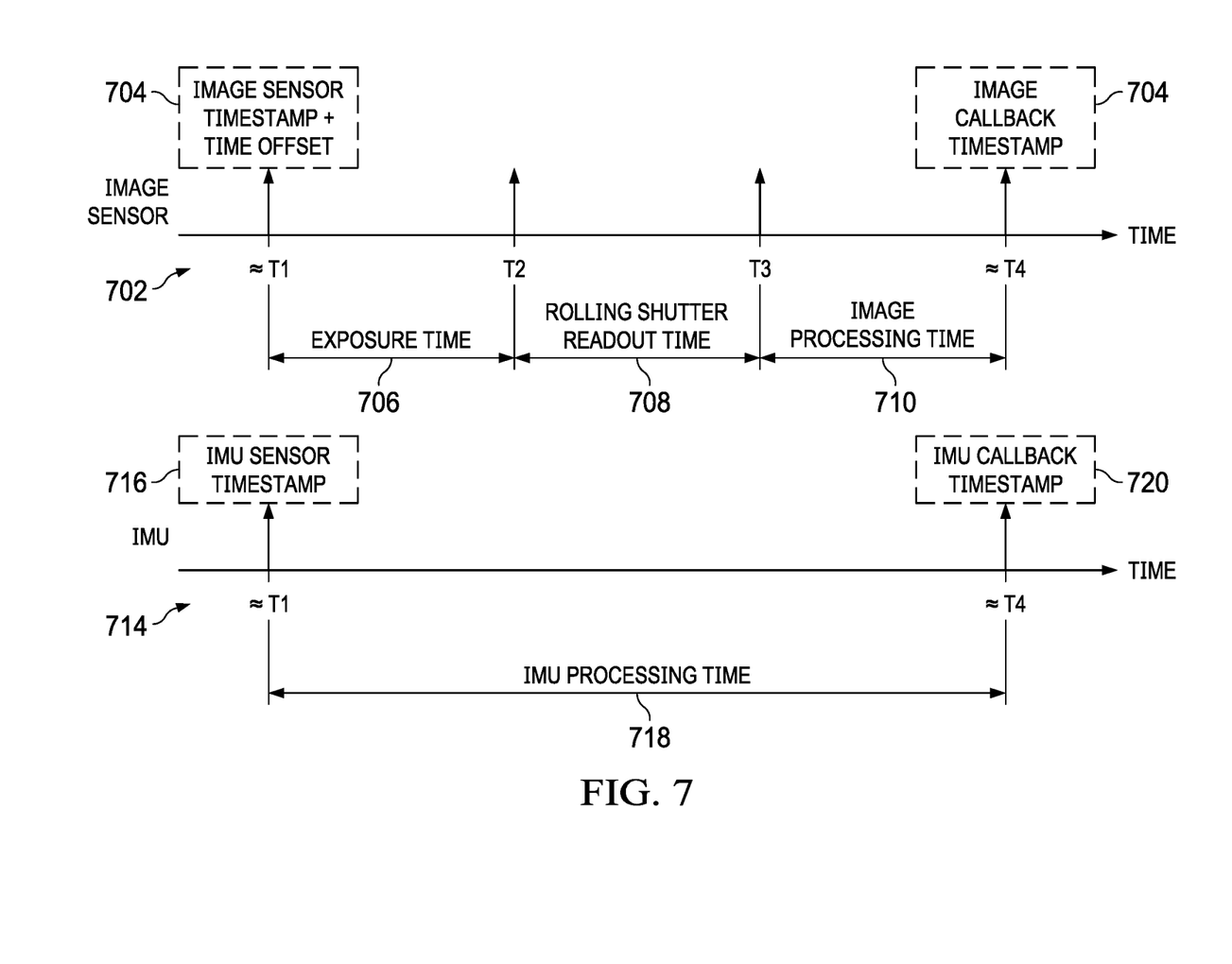
FIG. 7 is a set of graphs showing inertial management unit (IMU) events and image sensor events, respectively, each utilized to calculate a rough initial time offset estimate, in accordance with some embodiments.

FIG. 7 illustrates a first graph 602 showing the occurrence of image sensor events associated with an image sensor (for example, an embodiment of the image sensor 116 of FIG. 1) and a second graph 614 showing IMU events associated with an IMU (for example, an embodiment of the IMU 104) over time. The present example is described with respect to an embodiment of the device 100 of FIG. 1. Like reference numerals from the example of the device 100 are used to refer to like components in the present example.

In the present example, in response to detecting a time alignment issue between the IMU 104 and the image sensor 106, the processor 102 identifies an image callback (corresponding to an image being received by the processor 102) and an IMU callback (corresponding to IMU sensor data, such as gyroscope data, accelerometer data, or magnetometer data, being received by the processor 102) that occur at approximately the same time (e.g., within about 1 ms of one another), as defined by an image callback timestamp 712 and the IMU callback timestamp (both occurring at approximately time T4, as shown here). Since the respective data (image data, sensor data) associated with these callbacks are received by the processor 102 at the same time, the time of the callback timestamps (i.e., approximately T4 in the present example) can be used as a point of reference to compare the timing of the IMU 104 with the timing of the image sensor 116. It is assumed that IMU data and image data received at approximately the same time by the processor 102 should have IMU sensor and image sensor timestamps (when shifted by the time offset) that are approximately the same when timings of the IMU 104 and the image sensor 116 are aligned.

For example, for IMU sensor data and associated image data received at approximately the same time by the processor 102, the sum of the time offset and the image sensor timestamp associated with the image data (the sum here represented by a shifted image sensor timestamp 704) should be equal to the IMU sensor timestamp 716 associated with the IMU sensor data. In view of this, the time offset can be calculated as the difference between the IMU sensor timestamp and the image sensor timestamp. In the present example, the values of the image sensor timestamp and the IMU sensor timestamp 716 are known, but the value of the time offset needed to produce the shifted image sensor timestamp 704 is unknown and the timestamps generated by the IMU 104 and those generated by the image sensor 116 are not directly relatable to one another. The shifted image sensor timestamp 704 is instead related to the IMU sensor timestamp 716 using the approximate time T4 of the image callback timestamp 712 and the IMU callback timestamp 720 as a common reference point.

As shown in the graph 702, the shifted image sensor timestamp 704 is associated, approximately, with time T1. The shifted image sensor timestamp 704 corresponds to the time at which exposure is initiated when the image sensor 116 begins capturing the image, shifted by the time offset. A delay between the shifted image sensor timestamp 704 and the image callback timestamp 712 (when the image data is received by the processor 102) can be estimated as the sum of an exposure time 706 from approximately time T1 to time T2, a rolling shutter readout time 708 from time T2 to time T3, and an image processing time 710 from time T3 to approximately time T4. The processor 102 estimates the exposure time 706 and the rolling shutter readout time 708 based on settings and intrinsic properties of the image sensor 116, and estimates the image processing time 710, in some embodiments, as an average of previous image processing times of the image sensor 116. Thus, the relationship between the image callback timestamp 712 and the shifted image sensor timestamp 704 can be approximated according to Equation 1:

image callback timestamp=image sensor timestamp+
time offset+exposure time+rolling shutter readout time+image processing time    (EQ. 1)

As shown in the graph 714, the IMU sensor timestamp 716 is associated, approximately, with the time T1. Here, the IMU sensor timestamp 716 and the shifted image sensor timestamp 704 are assumed to correspond to approximately the same time T1 based on the assumption that image data and IMU sensor data received by the processor 102 at approximately the same time as one another should have associated timestamps corresponding to approximately the same time as one another. The delay between the IMU sensor timestamp 716 (corresponding to the time at which the IMU 104 measures the sensor data) and the IMU callback timestamp 720 (corresponding to the time at which the processor 102 receives the sensor data from the IMU 104) can be estimated as the IMU processing time 718. The processor 102 estimates the IMU processing time 718, in some embodiments, as an average of previous IMU processing times of the IMU 104. Accordingly, the relationship between the IMU sensor timestamp 716 and the image callback timestamp 712 can be approximated according to Equation 2:

IMU callback timestamp=IMU sensor timestamp+
image processing time    (EQ.2)

Since the image callback timestamp 712 and the IMU callback timestamp 720 both correspond approximately to time T4, the time offset can be estimated according to Equation 3:

time offset=(IMU sensor timestamp+image processing time)−(image sensor timestamp+time offset+exposure time+rolling shutter readout time+image processing time)    (EQ.3)

The result of this estimation of the time offset is referred to herein as the "rough initial time offset estimate". Once the rough initial time offset estimate is calculated, the processor 102 sets it as the time offset that is applied to image sensor timestamps of the image sensor 116 to better align the timing between the IMU 104 and the image sensor 116.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for visual-inertial odometry (VIO) calibration of a device, the method comprising:
   estimating VIO calibration parameters during an active XR session implemented by the device;
   during an initial time period, validating the estimated VIO calibration parameters based on VIO performance;
   validating, by a machine learning module, the estimated VIO calibration parameters via a strict calibration qualification by:
      providing, to a trained machine learning model at the machine learning module, input parameters for validating the estimated VIO calibration parameters, the input parameters comprising at least one or the estimated VIO calibration parameters, calibration uncertainty, user motion, or inlier feature number; and
      processing, by the trained machine learning model, the input parameters to produce a qualification result indicative of an accuracy of the estimated VIO calibration parameters; and
   storing, responsive to determining that the estimated VIO calibration parameters are valid, the estimated VIO calibration parameters at a storage device.

2. The method of claim 1, wherein validating the estimated VIO calibration parameters via the strict calibration qualification further comprises:
   performing comparisons of each of the input parameters to respective threshold values with a thresholding module, wherein the qualification result is generated further based on the comparisons.

3. The method of claim 1, wherein a portion of the input parameters comprises at least accelerometer scale, accelerometer misalignment, and focal length, and wherein the trained machine learning model further receives and processes an error between the estimated VIO calibration parameters and factory VIO calibration parameters to generate one or more outputs.

4. The method of claim 1, wherein the estimated VIO calibration parameters include inertial management unit (IMU) intrinsics, image sensor intrinsics, IMU-image-sensor extrinsics, and IMU-image-sensor time alignment parameters.

5. The method of claim 4, wherein the IMU intrinsics include at least one of gyroscope scale, gyroscope skewness, accelerometer scale, accelerometer skewness, accelerometer misalignment, gyroscope misalignment, gyroscope-accelerometer rotation quaternion, gyroscope bias, or accelerometer bias, wherein the image sensor intrinsics include a focal length and an optical center of an image sensor of the device, wherein the IMU-image-sensor extrinsics include a rotation quaternion and translation vector between an optical frame of reference of the image sensor and an IMU frame of reference of an IMU of the device, and the IMU-image-sensor time alignment parameters include a time offset between the image sensor and the IMU.

6. A device, comprising:
   an inertial management unit (IMU);
   at least one image sensor configured to capture image data;
   a mass storage device configured to store calibration data;
   at least one processor communicatively coupled to the at least one image sensor and the IMU; and at least one memory device configured to store computer-readable instructions that, when executed by the at least one processor, cause the at least one processor to:
estimate visual-inertial odometry (VIO) calibration parameters during a session;
utilize a calibration qualification module including a machine learning module to validate the estimated VIO calibration parameters via a strict calibration qualification by:
provide, to a trained machine learning model at the machine learning module, input parameters for validating the estimated VIO calibration parameters, the input parameters comprising at least one or the estimated VIO calibration parameters, calibration uncertainty, user motion, or inlier feature number; and
processing, by the trained machine learning model, the input parameters to produce a qualification result indicative of an accuracy of the estimated VIO calibration parameters; and
store, responsive to determining that the estimated VIO calibration parameters are valid, the estimated VIO calibration parameters at the mass storage device.

7. The device of claim 6, wherein the calibration qualification module includes a thresholding module, and wherein the computer-readable instructions further cause the processor to:
perform comparisons of each of the input parameters to respective threshold values with the thresholding module, wherein the qualification result is generated based on the comparisons.

8. The device of claim 6, wherein a portion of the input parameters comprises accelerometer scale, accelerometer misalignment, and focal length, and wherein the trained machine learning model further receives and processes an error between the estimated VIO calibration parameters and factory VIO calibration parameters to generate the one or more outputs.

9. The device of claim 6, wherein the estimated VIO calibration parameters include inertial management unit (IMU) intrinsics, image sensor intrinsics, IMU-image-sensor extrinsics, and IMU-image-sensor time alignment parameters.

10. The device of claim 9, wherein the IMU intrinsics include at least one of gyroscope scale, gyroscope skewness, accelerometer scale, accelerometer skewness, accelerometer misalignment, gyroscope misalignment, gyroscope-accelerometer rotation quaternion, gyroscope bias, or accelerometer bias, wherein the image sensor intrinsics include a focal length and an optical center of the at least one image sensor, wherein the IMU-image-sensor extrinsics include a rotation quaternion and translation vector between an optical frame of reference of the at least one image sensor and an IMU frame of reference of the IMU, and the IMU-image-sensor time alignment parameters include a time offset between the at least one image sensor and the IMU.

11. The method of claim 1, further comprising:
based on the estimated VIO calibration parameters not being valid, retaining an original calibration including one or more original VIO calibration parameters.

12. The method of claim 1, further comprising:
based on a VIO fault condition occurring, performing the validating, by the machine learning model, of the estimated VIO calibration parameters via the strict calibration qualification.

13. The method of claim 12, wherein the VIO fault condition indicates a predetermined number of initialization failures.

14. The device of claim 6, wherein the computer-readable instructions further cause the at least one processor to:
based on the estimated VIO calibration parameters not being valid, retain an original calibration including one or more original VIO calibration parameters.

15. The device of claim 6, wherein the computer-readable instructions further cause the at least one processor to:
based on a VIO fault condition occurring, perform the validating of the estimated VIO calibration parameters via the strict calibration qualification.

16. The device of claim 15, wherein the VIO fault condition indicates a predetermined number of VIO resets.

* * * * *